United States Patent [19]

Schramm

[11] Patent Number: 4,909,528
[45] Date of Patent: Mar. 20, 1990

[54] REAR WHEEL STEERING DRIVE MECHANISM

[75] Inventor: Scott W. Schramm, Novi, Mich.

[73] Assignee: Chrysler Corporation, Highland Park, Mich.

[21] Appl. No.: 351,884

[22] Filed: May 15, 1989

[51] Int. Cl.$^4$ ............................................. B62D 7/14
[52] U.S. Cl. ......................................... 280/91; 74/497
[58] Field of Search ...................... 280/91, 99; 74/497, 74/110

[56] References Cited

U.S. PATENT DOCUMENTS

| | | | |
|---|---|---|---|
| 455,248 | 6/1891 | Fennell | 74/110 |
| 1,951,147 | 3/1934 | Greist | 280/91 |
| 4,295,657 | 10/1981 | Sano et al. | 280/91 |

FOREIGN PATENT DOCUMENTS 61-18573  1/1986  Japan ...................................... 280/91

Primary Examiner—Charles A. Marmor
Assistant Examiner—Karin Tyson
Attorney, Agent, or Firm—Edward A. Craig

[57] ABSTRACT

A rear wheel steering driving mechanism is provided for a vehicle having a front wheel steering system and a rear wheel steering system. The drive mechanism includes an input link adapted to be operatively connected to the front wheel steering system for translation thereby whenever the front wheel steering system is activated and an output link adapted to be operably connected to the rear wheel steering system to selectively transmit front wheel steering system activity to the rear wheel system.

5 Claims, 5 Drawing Sheets

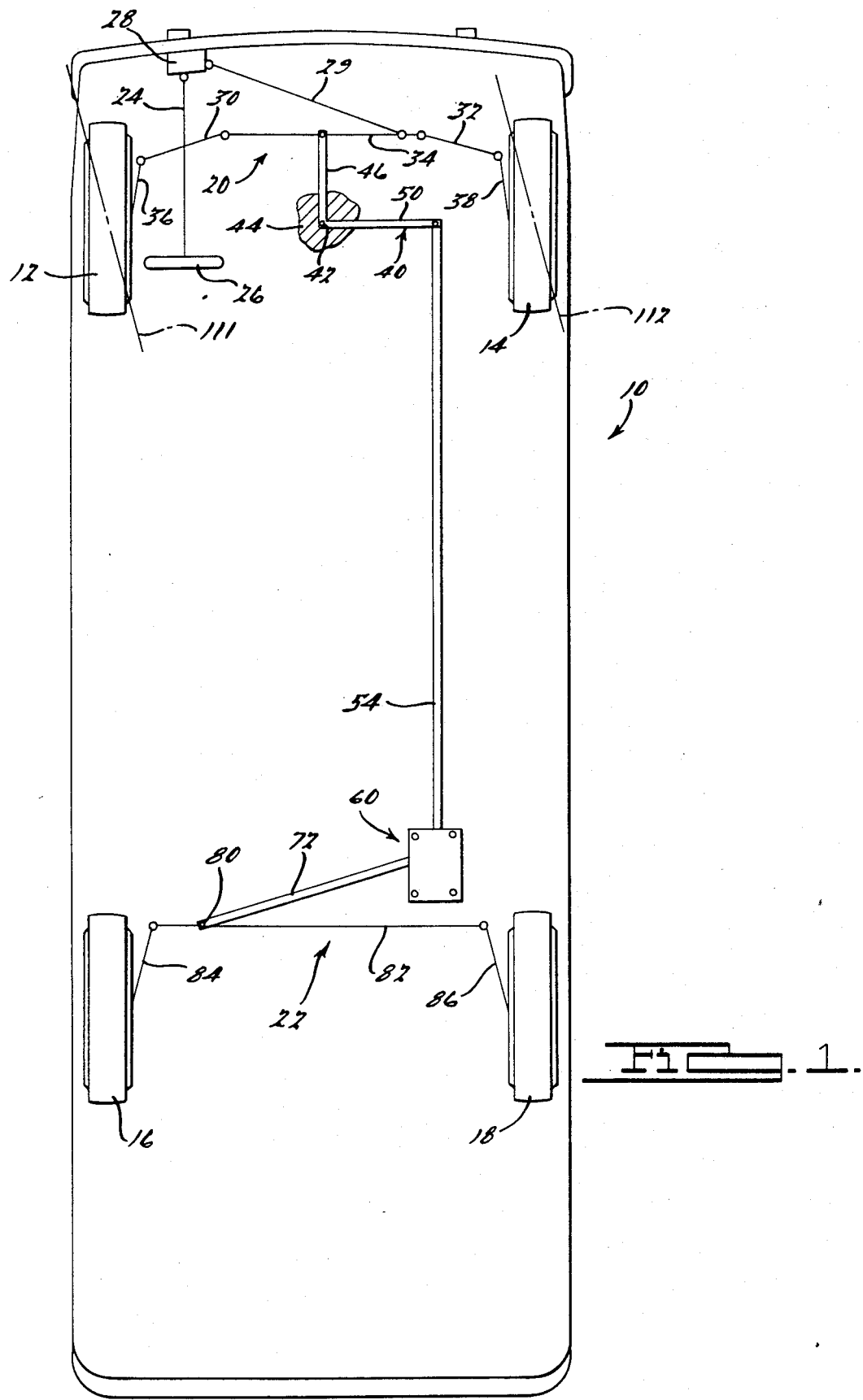

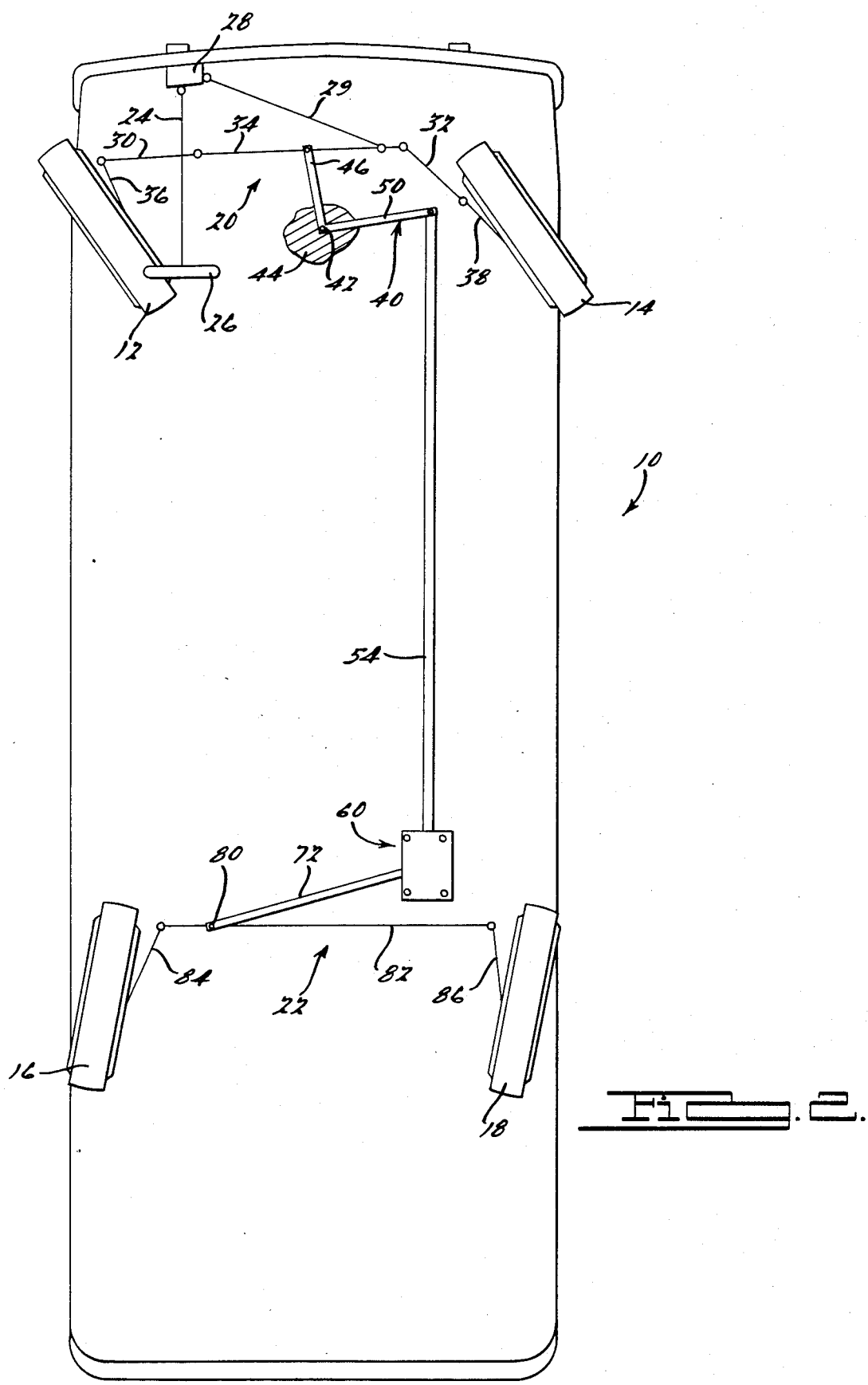

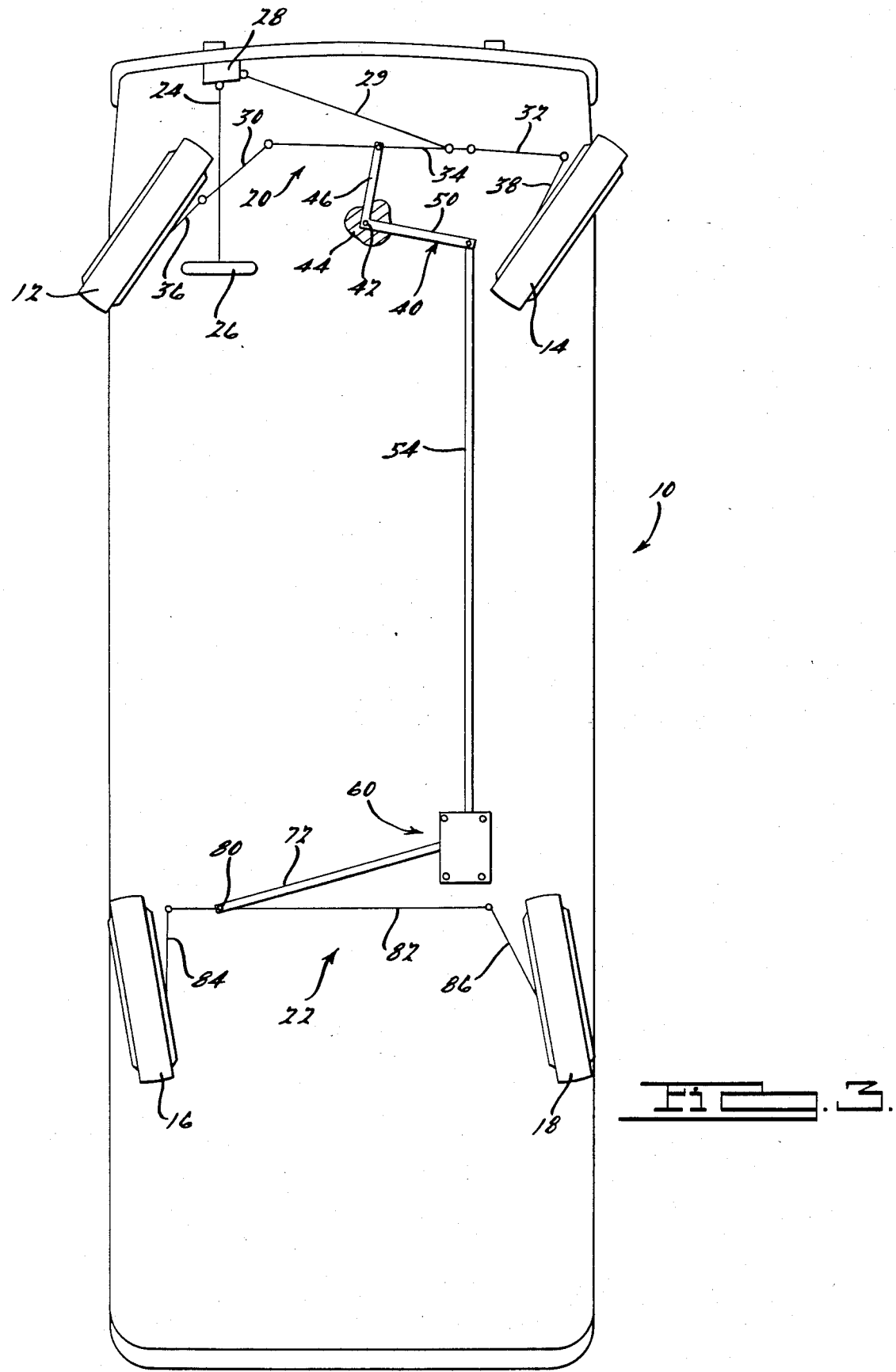

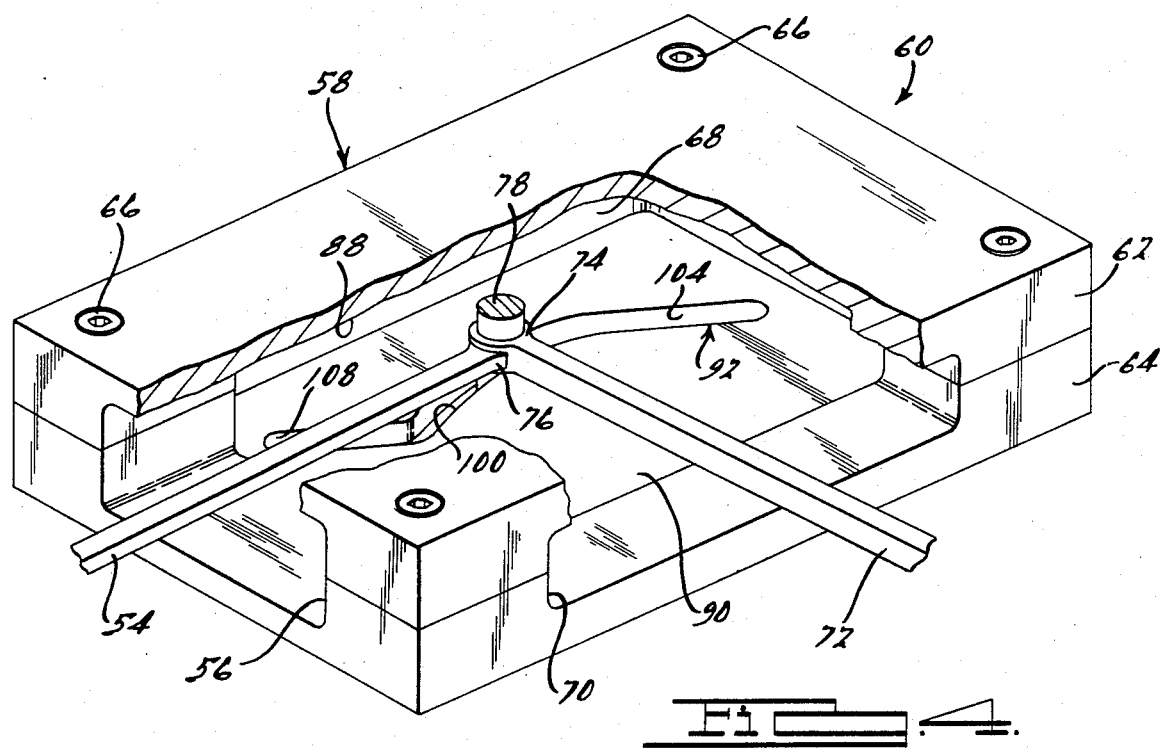
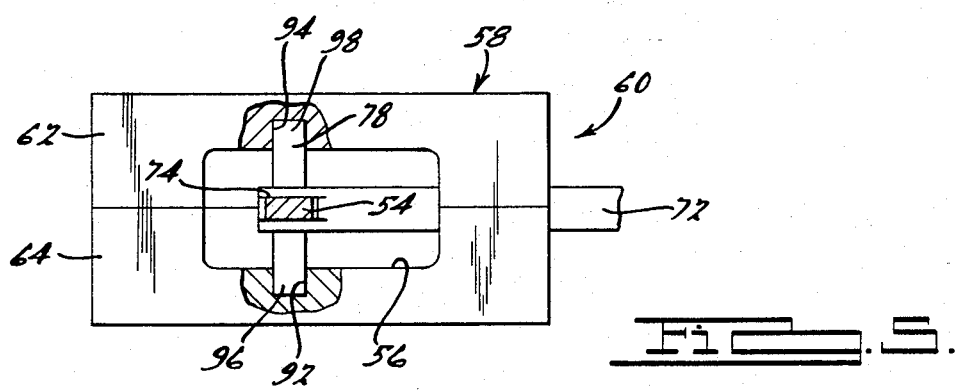
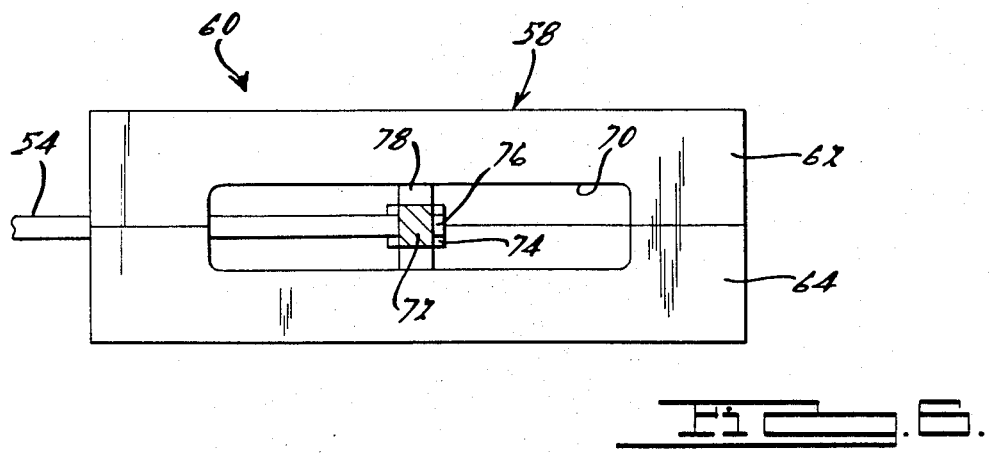

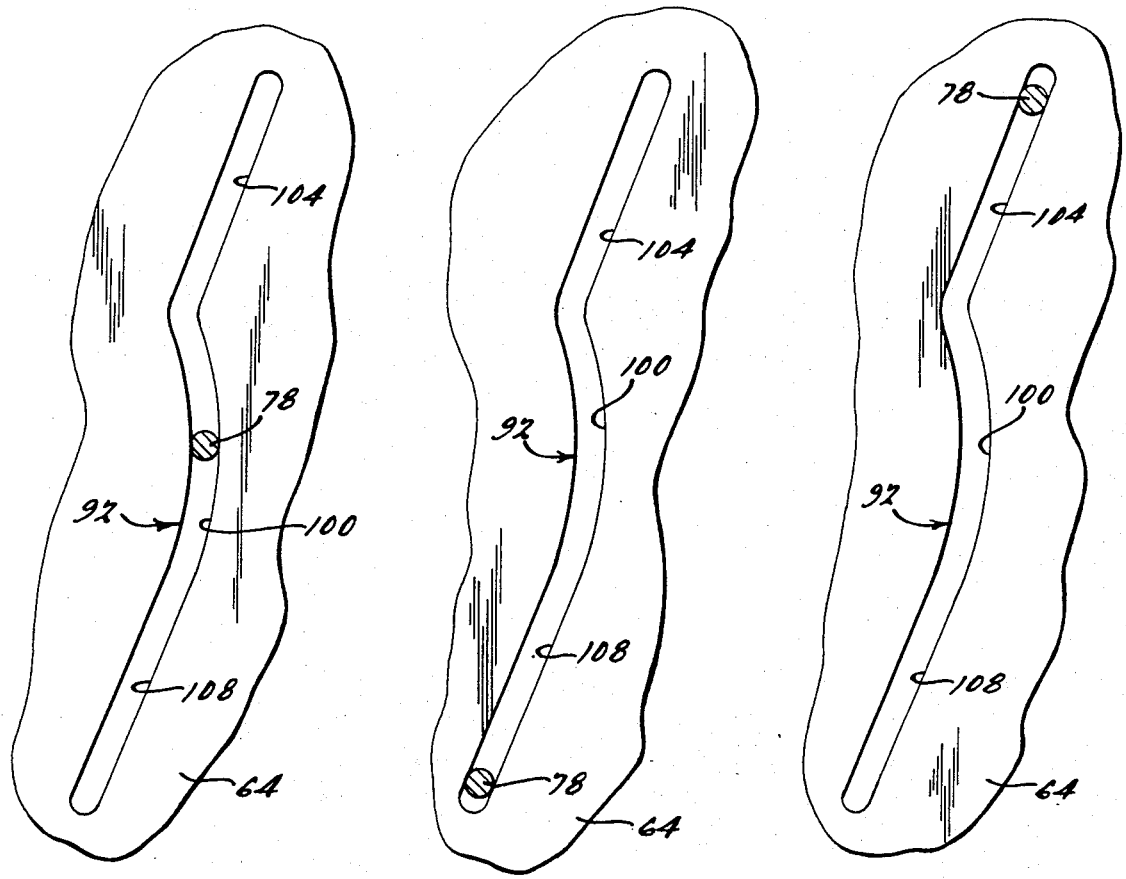
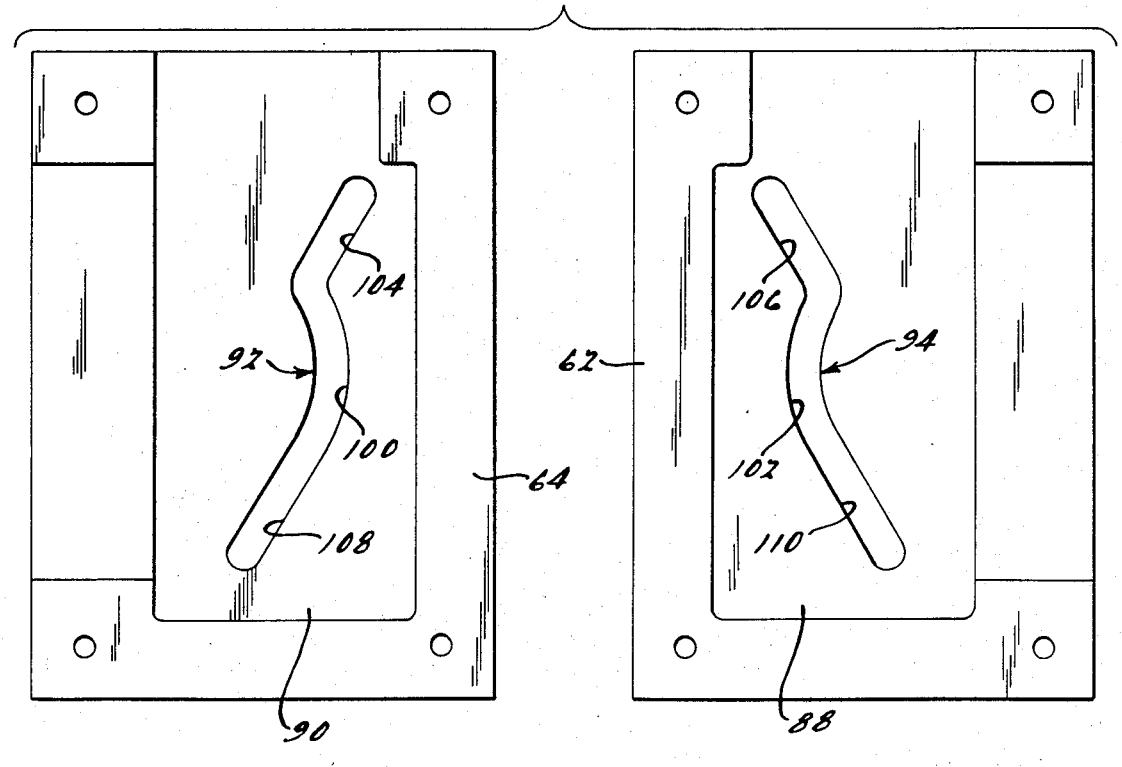

REAR WHEEL STEERING DRIVE MECHANISM

BACKGROUND OF THE INVENTION

1. Field of the Invention

The present invention relates to a vehicle steering device in which both the front wheels and the rear wheels are steered.

2. Description of the Prior Art

In the past, four-wheeled vehicles, such as automobiles and trucks, have conventionally been steered by manipulation of the front wheels only. Front wheel steering has proved to be satisfactory for operation of most vehicles, particularly smaller wheelbase vehicles such as automobiles. Steering of both the front and rear wheels has not been considered particularly useful for most straight ahead driving situations.

However, it would be desirable in longer wheelbase vehicles, such as large vans, to steer the rear wheels under certain conditions. For example, if the rear wheels can be steered when turning around a corner, making a U-turn, and other similar situations, the turning radius is desirably reduced to facilitate improved maneuverability of such vehicles in situations where turning space is limited.

In accordance with the present invention, a rear wheel steering drive mechanism is provided wherein the steering action for the rear wheels does not come into play until after the front wheels have been turned through a preliminary angle. The rear wheels are only steered after the front wheels have been turned beyond an angle which represents a severe turn of the vehicle such as will occur when making a U-turn or going around a corner. In straight ahead driving, the rear wheels are not steered during small steering manipulations of the front wheels which normally occur during the course of such straight ahead driving. U.S. Pat. No. 4,813,694, issued Mar. 21, 1989, illustrates a cam actuated mechanism suitable for this purpose. The present invention relates to a simplified cam operated mechanism.

SUMMARY OF THE INVENTION

A rear wheel steering drive mechanism is provided for a vehicle having a front wheel steering system and a rear wheel steering system. The rear wheel steering drive mechanism comprises a casing with an input link and an output link extending into the casing. The input ink is adapted to be pivotally connected to the front wheel steering system for translation thereby whenever the front wheel steering system is activated. The output link is adapted to be pivotally connected to the rear wheel steering system to selectively transmit front wheel steering system activity to the rear wheel steering system.

A cam pin is positioned within the casing and connected to the input link for movement therewith. The cam pin is also connected to the output link for translation thereof. The casing has an interior cavity including an upper surface and a lower surface. At least one of the upper and lower surfaces includes a cam groove. The cam pin extends into the cam groove.

The cam groove has a central circular first cam portion the center of which is coincident with the pivotal connection of the output link with the rear wheel steering system. The cam pin is positioned at substantially the midpoint of the first cam portion when the vehicle front wheel steering system is in the straight ahead mode whereby initial actuation of the front wheel steering system with concomitant translation of the input link is ineffective to cause translation of the output link so long as the cam pin is positioned within the first cam portion.

The cam groove has a second cam portion extending outwardly from one end of the first cam portion in a direction away from the pivotal connection of the output link with the rear wheel steering system. A third cam portion extends outwardly from the other end of the first cam portion in a direction towards the pivotal connection of the output link with the rear wheel steering system. Continued actuation of the front steering system ultimately translates the input link and thus the cam pin to a position where the cam pin enters one of the second or third cam portions depending upon the direction of front wheel steering with resultant translation of the output link and actuation of the rear wheel steering system.

Preferably, the second and third cam portions are linear and parallel to each other. A bell crank is preferably used to connect the input link to the front wheel steering system. Desirably, each upper and lower cavity surface includes a cam groove with the cam grooves being mirror images of each other and being in alignment with each other. One end of the cam pin is received in one of the grooves and the other end of the cam pin is received in the other of the grooves.

BRIEF DESCRIPTION OF THE DRAWINGS

FIG. 1 is a diagrammatic plan view of a vehicle having a front wheel steering system and a rear wheel steering system with the rear wheel steering drive mechanism of the present invention interposed therebetween and with all of the wheels of the vehicle in the straight ahead mode;

FIG. 2 is a view similar to FIG. 1 illustrating turning of the front wheels to the left with the rear wheels being turned to the right;

FIG. 3 is a view similar to FIG. 1 with the front wheels turned to the right and the rear wheels turned to the left;

FIG. 4 is a perspective view of the rear wheel steering drive mechanism with portions broken away for the purpose of clarity;

FIG. 5 is an end view of the mechanism of FIG. 4 with portions broken away for the purpose of clarity;

FIG. 6 is a side view of the mechanism of FIG. 4;

FIG. 7 is a plan view of the interior surface of the upper and lower casing members forming part of the rear wheel steering drive mechanism;

FIG. 8 is a view of the cam groove of FIG. 7 illustrating the cam pin in the centered position;

FIG. 9 is a view similar to FIG. 8 illustrating the cam pin in a position wherein the rear wheels are turned to the left; and FIG. 10 is a view similar to FIG. 8 with the cam pin in a position where the rear wheels are turned to the right.

DETAILED DESCRIPTION OF A PREFERRED EMBODIMENT

Referring first to FIG. 1; a vehicle 10 is diagrammatically illustrated. The vehicle 10 includes a pair of front wheels 12, 14 and a pair of rear wheels 16, 18. A conventional front wheel steering system 20 is provided for the front wheels and a conventional rear wheel steering system 22 is provided for the rear wheels. A steering column 24, carrying a steering wheel 26, is provided for manual steering by the driver of the vehicle. The steering column 24 is connected to a direction changing means installed in a gear box 28. Rotation of the steering column 24 is transformed to right or left turning of the front wheels 12, 14 by means of a drag link 29 which is connected to a center link 34 under, for example, a rack-and-pinion type of direction changing means. The link 34 is connected to tie rods 30, 32 which are connected to the arms of steering knuckles 36, 38. The steering action may be assisted as is usual by power steering structure provided in the gear box 28.

A bell crank 40 is pivotally connected at 42 to fixed support structure 44. One arm 46 extends from pivot 42 into pivotal connection with the center link 34. The second arm 50, which extends at right angles from the arm 46, is pivotally connected to one end of an elongated input link 54. The link 54 extends longitudinally of the vehicle 10 through an opening 56 provided in the casing 58 of the rear wheel steering drive mechanism 60 (FIGS. 4 and 6). The bell crank 40 is caused to pivot about the pivot point 42 upon movement of the center link 34 which occurs during actuation of the front wheel steering system 20. As will be noted in FIG. 2, the bell crank pivots in the counterclockwise direction upon turning of the front wheels to the left and, as illustrated in FIG. 3, in the clockwise direction upon turning of the front wheels to the right. As will be appreciated, turning of the front wheels to the left causes the arm 50 to pull the input link 54 forwardly causing translation of the link in the forward direction while turning of the front wheels to the right results in the arm 50 pushing the input link 54 causing translation of this link rearwardly of the vehicle 10.

The casing 58 includes an upper casing member 62 and a lower casing member 64. These casing members are secured together by means of cap screws 66. Each casing member has a recess extending outwardly from the inner surface thereof to define an interior cavity 68. As previously mentioned, an opening 56 is provided for insertion of the rearward end of the input link 54. A second opening 70 is provided for reception of one end of an output link 72. The forward end 74 of the output link 72 is bifurcated and is received over the rearward end 76 of input link 54. A cam pin 78 is received through openings in the ends 74, 76 to thereby pivotally secure the input link 54 to the output link 72.

The output link 72 serves as a steering drag link. It is pivotally connected to a tie rod 82. The tie rod 82 is connected to the arms 84, 86 of the rear wheel steering knuckles for turning of the rear wheels 16, 18. As will be appreciated, movement of the tie rod 82 to the left, as viewed in FIG. 1, will result in turning the rear wheels to the right while movement of the tie rod 82 to the right, as viewed in FIG. 1, will result in turning the rear wheels to the left. As will be noted in FIGS. 2 and 3, the rear wheels 16, 18 are turned to the right when the front wheels 12, 14 are turned to the left and are turned to the left when the front wheels are turned to the right.

Rear wheel steering is controlled by the cam pin 78. As above-mentioned, the cam pin 78 is positioned within the casing interior cavity 68. The cavity 68 has an upper surface 88 and a lower surface 90. A cam groove 92, 94 is formed in each of the upper and lower casing members 62, 64 and defines a portion of the surfaces 88, 90. The cam grooves 92, 94 are mirror images of each other and are in alignment with each other. One end 96 of the cam pin is received in the groove 92 while the other end 98 is received in the cam groove 94. The provision of a pair of grooves stabilizes the cam pin position.

As will be noted in FIG. 7, each cam groove 92, 94 has a central circular first cam portion 100, 102. The center of these portions is coincident with the pivotal connection 80 of the output link 72 with the tie rod 82. The cam pin 78 is positioned at substantially the midpoint of the first cam portions 100, 102 when the vehicle front wheel steering system is in the straight ahead mode as shown in FIG. 1. As will be appreciated, when the output link 72 is translated either forwardly or rearwardly by means of the bell crank 40, the cam pin 78 will ride in the first cam portions 100, 102. This will cause pivoting of the output link 72. However, in view of the fact that the pivot center 80 is coincident with the center of the cam portions 100, 102, there will not be translation of the output link 72 which would result in actuation of the rear wheel steering system 22. Thus, initial actuation of the front wheel steering system with concomitant translation of the input link 54 is ineffective to cause translation of the output link 72 so long as the cam pin is positioned within the first cam portions 100, 102.

The cam grooves 92, 94 each have a second cam portion 104, 106 which extends outwardly from one end of the first cam portions in a direction away from the pivotal connection 80 of the output link 72 with the tie rod 82. Third cam portions 108, 110 extend outwardly from the other end of the first cam portions in a direction towards the pivotal connection of 80 of the output link 72 with the tie rod 82 and are preferably tangential to the first cam portions. Preferably, the second and third cam portions are linear and are parallel to each other, that is, the cam portions 104, 106 are parallel to the cam portions 108, 110.

Continued actuation of the front wheel steering system ultimately moves the cam pin 78 to a position where the cam pin enters one of the second or third cam portions depending upon the direction of front wheel steering with resultant translation of the output link 72 and actuation of the rear wheel steering system 22.

When the front wheels 12, 14 are turned to the left as viewed in FIG. 2, it is desired that the rear wheels 16, 18 be turned to the right as shown. When the front wheels are turned to the left, the bell crank 40 will cause translation of the input link 54 forwardly as illustrated in FIG. 2. This will cause the cam pin 78 to move into the second cam portions 104, 106 as illustrated in FIG. 10. This results in the output link 72 being translated to the right as viewed in FIG. 2 with resultant turning of the rear wheel 16, 18 to the right as shown because the cam portions 104, 106 are angled to the right. Conversely, when the cam pin 78 is moved into the third cam portions 108, 110 as shown in FIG. 9, the output link 72 will be translated to the left as viewed in FIG. 3 because the cam portions 108, 110 are angled to the left with the result that the rear wheel 16, 18 will turn to the left as shown. This is consistent with the fact that the front wheels 12, 14 have been turned to the right.

Return of the steering system to the straight ahead mode will result in all of the wheels assuming the straight ahead position as shown in FIG. 1.

In a preferred embodiment of the invention, rear wheel steering does not take place until the front wheels have been turned about 15 degrees in either direction. The lines 111, 112 shown in FIG. 1 illustrates turning of the front wheels 15 degrees at which point rear wheel steering will begin. Rear wheel steering takes place between 15 and 35 degrees of front wheel steering, the 35 degree point being indicated by the position of the wheels 12, 14 in FIGS. 2 and 3. The maximum extent of rear wheel steering in the present embodiment is about 10 degrees as indicated by the position of the rear wheels 16, 18 in FIGS. 2 and 3.

I CLAIM:

1. A rear wheel steering drive mechanism for a vehicle having a front wheel steering system and a rear wheel steering system, the rear wheel steering drive mechanism comprising a casing having an interior cavity, the casing having opening means communicating with the cavity, an input link and an output link extending through the opening means into the casing cavity, the input link adapted to be pivotally connected to the front wheel steering system for translation thereby whenever the front wheel steering system is activated, the output link adapted to be pivotally connected to the rear wheel steering system to selectively transmit front wheel steering system activity to the rear wheel steering system, the casing interior cavity including an upper surface and a lower surface, at least one of the upper and lower surfaces including a cam groove, a cam pin positioned within the casing and connected to the input link for movement therewith, the cam pin also being connected to the output link for translation thereof, the cam pin extending into the cam groove, the cam groove having a central curved first cam portion the center of which is coincident with the pivotal connection of the output link with the rear wheel steering system, the cam pin being positioned at substantially the midpoint of the first cam portion when the vehicle front wheel steering system is in the straight ahead mode whereby initial actuation of the front wheel steering system with concomitant translation of the input link is ineffective to cause translation of the output link so long as the cam pin is positioned within the first cam portion, the cam groove having a second cam portion extending outwardly from one end of the first cam portion in a direction away from the pivotal connection of the output link with the rear wheel steering system, and a third cam portion extending outwardly from the other end of the first cam position in a direction towards the pivotal connection of the output link with the rear wheel steering system, continued actuation of the front wheel steering system ultimately translating the input link and thus the cam pin to a position where the cam pin enters one of the second or third cam positions depending upon the direction of front wheel steering with resultant translation of the output link and actuation of the rear wheel steering system.

2. A rear wheel steering drive mechanism as defined in claim 1, further characterized in that the second and third cam portions are linear.

3. A rear wheel steering drive mechanism as defined in claim 2, further characterized in that the second and third cam portions are parallel.

4. A rear wheel steering drive mechanism as defined in claim 1, further characterized in the provision of a bell crank pivotally connecting the input link to the front wheel steering system.

5. A rear wheel steering drive mechanism as defined in claim 1, further characterized in that each of said upper and lower cavity surfaces includes a cam groove, the cam grooves being mirror images of each other and being in alignment with each other, one end of the cam pin being received in one of the grooves and the other end of the cam pin being received in the other of the grooves.

* * * * *